United States Patent
Halevy et al.

(10) Patent No.: US 7,739,258 B1
(45) Date of Patent: Jun. 15, 2010

(54) FACILITATING SEARCHES THROUGH CONTENT WHICH IS ACCESSIBLE THROUGH WEB-BASED FORMS

(75) Inventors: Alon Y. Halevy, Los Altos, CA (US); Jayant Madhavan, San Francisco, CA (US); David H. Ko, San Lorenzo, CA (US)

(73) Assignee: Google Inc., Mountain View, CA (US)

( * ) Notice: Subject to any disclaimer, the term of this patent is extended or adjusted under 35 U.S.C. 154(b) by 215 days.

(21) Appl. No.: 11/398,970

(22) Filed: Apr. 5, 2006

Related U.S. Application Data

(60) Provisional application No. 60/669,292, filed on Apr. 6, 2005.

(51) Int. Cl.
*G06F 17/00* (2006.01)
(52) U.S. Cl. ................ 707/706; 707/709; 707/710; 707/769; 707/770
(58) Field of Classification Search ............... 707/1, 707/2, 3, 4, 5, 10, 999.001, 999.002, 999.003, 707/999.004, 999.005, 999.01
See application file for complete search history.

(56) References Cited

U.S. PATENT DOCUMENTS

| | | | |
|---|---|---|---|
| 5,442,778 A | 8/1995 | Pedersen | |
| 6,547,829 B1* | 4/2003 | Meyerzon et al. | 715/234 |
| 6,675,159 B1 | 1/2004 | Lin | |
| 6,687,696 B2 | 2/2004 | Hofmann | |
| 6,738,678 B1 | 5/2004 | Bharat et al. | 700/48 |
| 6,799,176 B1 | 9/2004 | Page | 707/5 |
| 6,931,397 B1* | 8/2005 | Sundaresan | 707/5 |
| 6,963,867 B2* | 11/2005 | Ford et al. | 707/3 |
| 7,308,464 B2* | 12/2007 | Nowitz et al. | 707/104.1 |
| 2003/0177111 A1* | 9/2003 | Egendorf et al. | 707/3 |
| 2003/0212737 A1 | 11/2003 | Mortez | |
| 2004/0153456 A1 | 8/2004 | Charnock | |
| 2005/0120292 A1* | 6/2005 | Suzuki | 715/501.1 |
| 2006/0282455 A1* | 12/2006 | Lee et al. | 707/102 |

OTHER PUBLICATIONS

Internet Archive, The Way Back Machine and indexed Web Pages, 2003, http://web.archive.org/web/20030207111023/http://www1.archive.org/index.php, pp. 1-19.*

\* cited by examiner

*Primary Examiner*—Hung Q Pham
(74) *Attorney, Agent, or Firm*—Park, Vaughan & Fleming LLP

(57) ABSTRACT

One embodiment of the present invention provides a system that facilitates crawling through web-based forms to gather information to facilitate subsequent searches through content which is accessible though the web-based forms. During operation, the system first obtains web-based forms to be searched. Note that the system can obtain these web-based forms from a number of sources. For example, the system can crawl through web sites to identify web-based forms, the system can receive manually provided web-based forms, or the system can find web-based forms through methods other than crawling. Next, the system creates database entries for the identified forms. This involves obtaining and storing metadata describing the identified forms into database entries and then storing these database entries in a form database to facilitate searches through content which is accessible through the identified forms. Note that this form database can include a web index and associated documents, which can be used to facilitate web search queries that return both ordinary documents and documents that result from form queries.

20 Claims, 5 Drawing Sheets

FORM DATABASE 107

WEB SOURCE 302
    -CLASS OF SOURCE
    -LOCATION MOST-RELEVANT TO SOURCE
    -PAGE-RANK OF SOURCE

FORM 304
    -CLASS OF FORM
    -LOCATION MOST-RELEVANT TO OBJECTS RETRIEVED FROM FORM
    -FIELDS
    -REQUIRED INPUT FIELDS
    -MAPPING BETWEEN FIELDS AND CLASS PROPERTIES
    -DESCRIPTIVE KEYWORDS FOR FORM

FIG. 3

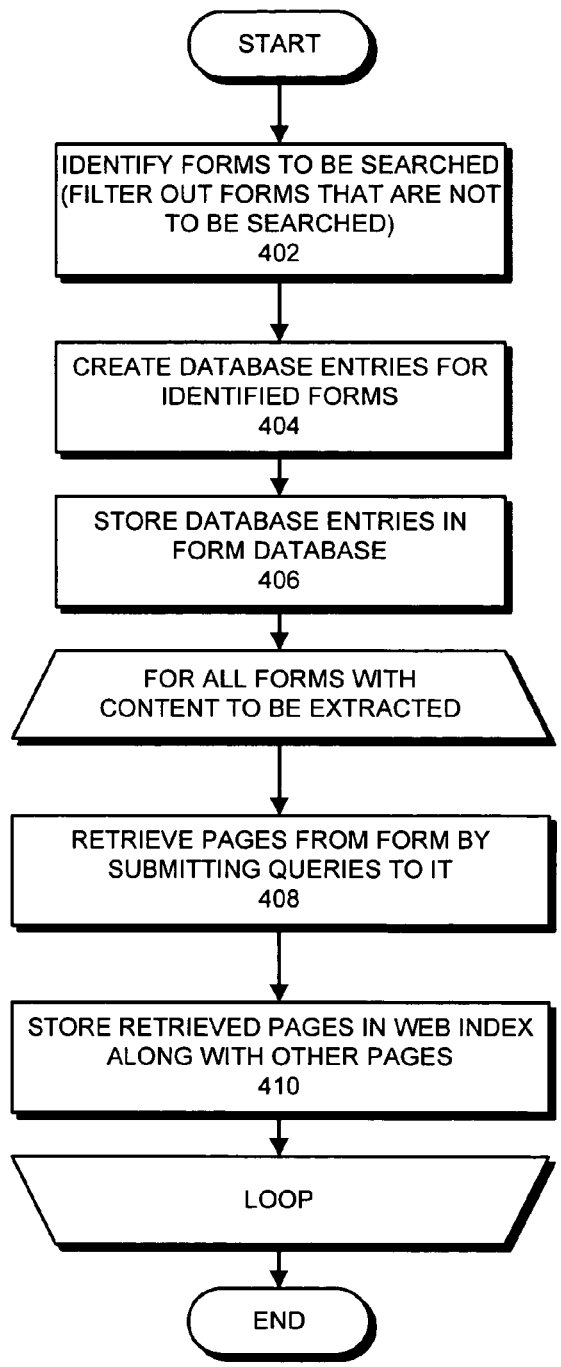
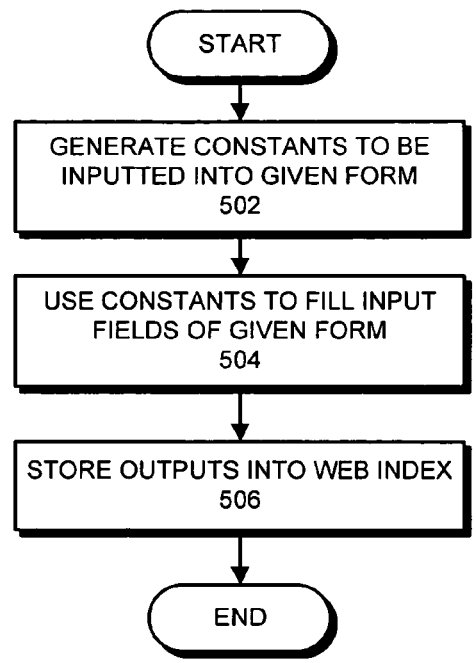
FIG. 4
FIG. 5

FACILITATING SEARCHES THROUGH CONTENT WHICH IS ACCESSIBLE THROUGH WEB-BASED FORMS

RELATED APPLICATIONS

This application claims priority under 35 U.S.C. section 119(e) to U.S. Provisional Application Ser. No. 60/669,292, entitled "Deep-Web Search Engine and Associated Tools," by the same inventors as the instant application, filed on 6 Apr. 2005, the contents of which are herein incorporated by reference. The subject matter of this application is also related to the subject matter in a co-pending non-provisional application by the same inventors as the instant application and filed on the same day as the instant application entitled, "Searching through Content which is Accessible through Web-Based Forms," having Ser. No. 11/399,568, and filing date 5 Apr. 2006

BACKGROUND

1. Field of the Invention

The present invention relates to techniques for performing searches through content on web sites. More specifically, the present invention relates to a method and an apparatus that facilitates searching through content which is not directly available on web pages, but is instead accessible though queries entered into web-based forms.

2. Related Art

Much of the power of the World Wide Web arises from the ability of search engines to rapidly comb through billions of web pages looking for pages associated with keywords of interest. Unfortunately, a large portion of the data which is available on the web is hidden behind web-based forms, and is consequently not searchable by traditional search engines.

A user typically accesses this type of data by filling in input fields in a web-based form. This causes a corresponding database query to be generated based on the values contained in the input fields, and the database query is submitted to an underlying database. This query causes data to be returned, and this data is typically displayed to a user. For example, a web-based form for local property tax records can accept an address in a set of input fields and can output a corresponding property tax record for the address. In another example, a web-based form for a chain of coffee shops can accept a city name or a postal code in a set of input fields and in response can display the locations of nearby coffee shops.

Traditional search engines lack the ability to search through this type of data which is hidden behind web-based forms. Consequently, a large amount of possibly relevant data cannot be easily accessed through traditional search engines.

Hence, what is needed is a method and an apparatus that facilitates efficiently searching through information which is hidden behind web-based forms.

SUMMARY

One embodiment of the present invention provides a system that facilitates crawling through web-based forms to gather information to facilitate subsequent searches through content which is accessible though the web-based forms. During operation, the system first obtains web-based forms to be searched. Note that the system can obtain these web-based forms from a number of sources. For example, the system can crawl through web sites to identify web-based forms, the system can receive manually provided web-based forms, or the system can find web-based forms through methods other than crawling. Next, the system creates database entries for the identified forms. This involves obtaining and storing metadata describing the identified forms into database entries and then storing these database entries in a form database to facilitate searches through content which is accessible through the identified forms. Note that this form database can include a web index and associated documents, which can be used to facilitate web search queries that return both ordinary documents and documents that result from form queries.

In a variation on this embodiment, obtaining the web-based forms to be searched involves manually or automatically filtering out other web-based forms, which are not to be searched.

In a variation on this embodiment, the system additionally extracts content from a given form, and stores the extracted content to facilitate subsequent searches through the content.

In a further variation, extracting the content from the given form involves accessing the given form through a Uniform Resource Locator (URL) which contains a GET-string that extracts the content from the given form.

In a further variation, extracting the content from the given form involves: generating constants to be inputted into the given form; using the constants to fill input fields of the given form; extracting the content from associated output fields of the given form; and storing the content in the form database to facilitate subsequent queries involving the content.

In a further variation, extracting and storing the content from the given form involves: obtaining constants associated with a given field of the given form from a drop-down menu associated with the given field; and storing the constants, whereby the constants can be subsequently used as inputs to the given field or as inputs to similar fields in other forms during subsequent query operations.

In a variation on this embodiment, obtaining metadata about an identified form involves obtaining information related to the source of the identified form. This can involve identifying: a class of the source; a geographic location most relevant to the source; and/or a page-rank of the source.

In a variation on this embodiment, obtaining metadata about an identified form involves identifying: a class of the identified form; a geographic location which is most relevant to objects retrieved from the identified form; fields of the identified form; required input fields or required combinations of input fields for the identified form; and/or mappings between fields of the identified form and associated class properties.

In a variation on this embodiment, a given form generates values for output fields by: forming a database query from constants received through input fields of the given form; sending the database query to a database system; receiving a response from the database system; and outputting data returned in the response through output fields of the given form.

One embodiment of the present invention provides a system that facilitates searching through content which is accessible though web-based forms. During operation, the system receives a query containing keywords. Next, the system analyzes the query to create a structured query. The system then performs a lookup based on the structured query in a database containing entries describing the web-based forms. Next, the system ranks forms returned by the lookup, and uses the rankings and associated database entries to facilitate a search through content which is accessible through the forms.

In a variation on this embodiment, while analyzing the query to create the structured query, the system first predicts a search-ontology class for the query based on keywords in the query. The system then constructs the structured query by mapping keywords in the query to properties of the predicted search-ontology class.

In a variation on this embodiment, facilitating the search involves facilitating a search through one or more forms of interest, which were identified during the ranking process.

In a further variation, facilitating the search through the one or more forms of interest involves presenting a highly-ranked form to a user through a "one-box" displayed prominently within a user interface.

In a further variation, while facilitating the search through the one or more forms of interest, the system first presents a user with query-through links to the one or more forms of interest. The system then allows the user to click on a query-though link which automatically causes a corresponding query to be submitted to an associated form of interest.

In a further variation, while presenting the user with a query-through link to a form of interest, the system first maps keywords from the query to input fields in the form of interest. Next, the system constructs a query-though link based on the mappings, which contains an invocation string to be submitted to the form of interest. The system then presents the query-through link to the user.

In a further variation, facilitating the search through the content involves searching through a local database containing content which was previously extracted from the forms during a preceding web-crawling process.

In a variation on this embodiment, ranking a form involves considering: an approximate page-rank score reflecting the number of incoming links to a web page associated with the form; a keyword score reflecting the relevance of text associated with a web page associated with the form; an ontology score which captures the relevance of a search ontology class selected for the query to a web page associated with the form; a form score which captures the ability of the form to answer the query; and/or a location score which captures the distance from the most relevant location for a web page associated with the form from locations detected in the query.

BRIEF DESCRIPTION OF THE FIGURES

FIG. 3 illustrates entries contained in a form database in accordance with an embodiment of the present invention.

FIG. 4 presents a flow chart illustrating the process of crawling through web pages to gather information related to web-based forms in accordance with an embodiment of the present invention.

FIG. 5 presents a flow chart illustrating the process of retrieving pages from a form in accordance with an embodiment of the present invention.

DETAILED DESCRIPTION

The following description is presented to enable any person skilled in the art to make and use the invention, and is provided in the context of a parti-cular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

System

Figure 1:
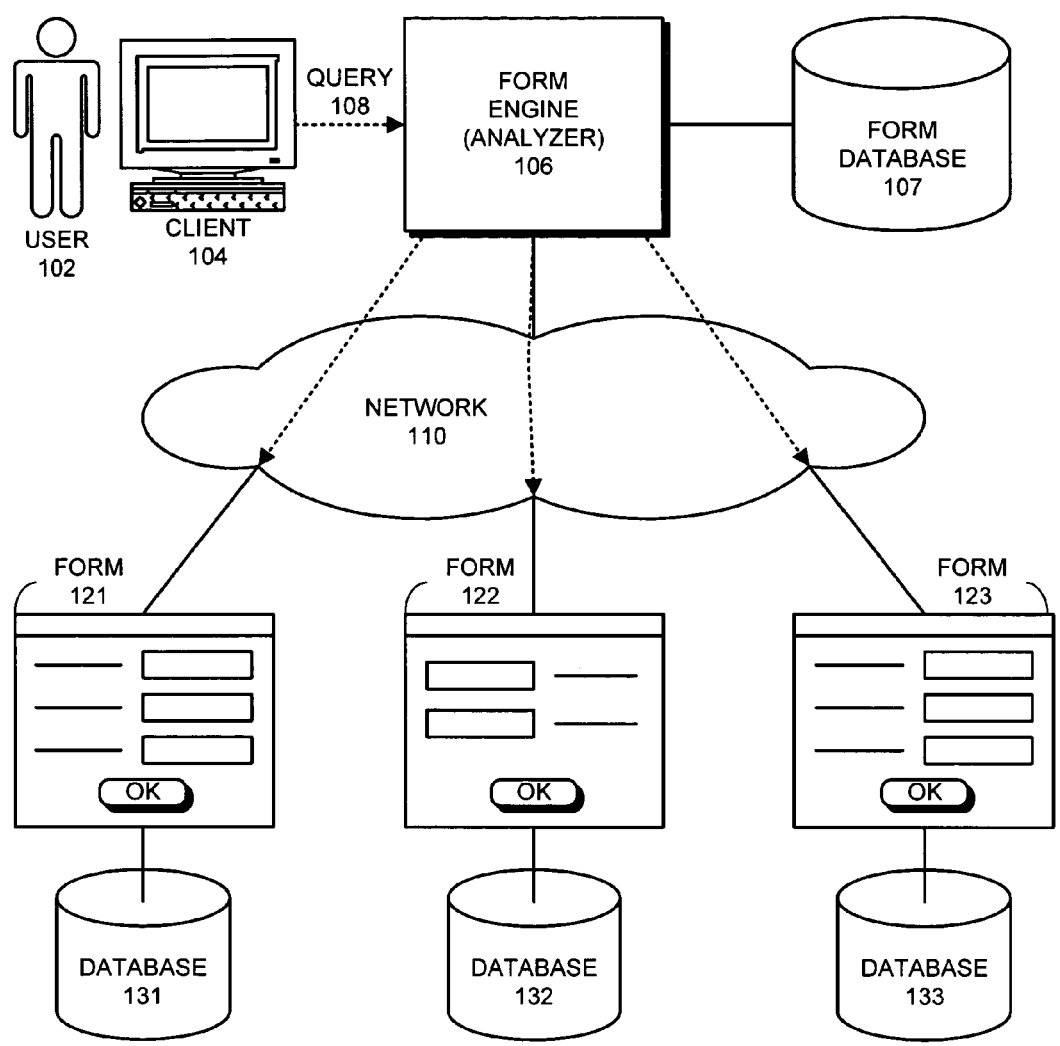
FIG. 1 illustrates a form engine which facilitates the process of searching through web-based forms in accordance with an embodiment of the present invention.

FIG. 1 illustrates a form engine 106 which facilitates searching through web-based forms in accordance with an embodiment of the present invention. Form engine 106 can generally exist on any computing device which is accessible through network 110. This computing device can include any type of computing device, including, but not limited to, a computing device based on a microprocessor, a mainframe computer, a digital signal processor, a portable computing device, a personal organizer, a device controller, and a computational engine within an appliance. Network 110 can generally include any type of wired or wireless communication channel capable of coupling together computing nodes. This includes, but is not limited to, a local area network, a wide area network, or a combination of networks. In one embodiment of the present invention, network 110 includes the Internet.

During a web-crawling process, form engine 106 accesses a number of forms 121-123 which are hosted on servers located throughout network 110. These forms 121-123 can be used to access to data within underlying databases 131-133. During this web-crawling process, form engine 106 first obtains web-based forms of interest, and then creates corresponding database entries for the identified forms in an associated form database 107. Note that the system can obtain these web-based forms from a number of sources. For example, the system can crawl through web sites to identify web-based forms, the system can receive manually provided web-based forms, or the system can find web-based forms through methods other than crawling.

During subsequent searching operations, form database 107 is used by form engine 106 to facilitate searches through content which is accessible through the web-based forms which are cataloged within form database 107. More specifically, a user 102 operating a client 104 can send a query 108 containing keywords to form engine 106. In response to query 108, form engine 106 uses information within form database 107 to perform a search through content which is accessible through forms 121-123. Note that form database 107 can include a web index and associated documents, which can be used to facilitate web search queries that return both ordinary documents and documents that were obtained from form queries.

Form Engine

Figure 2:
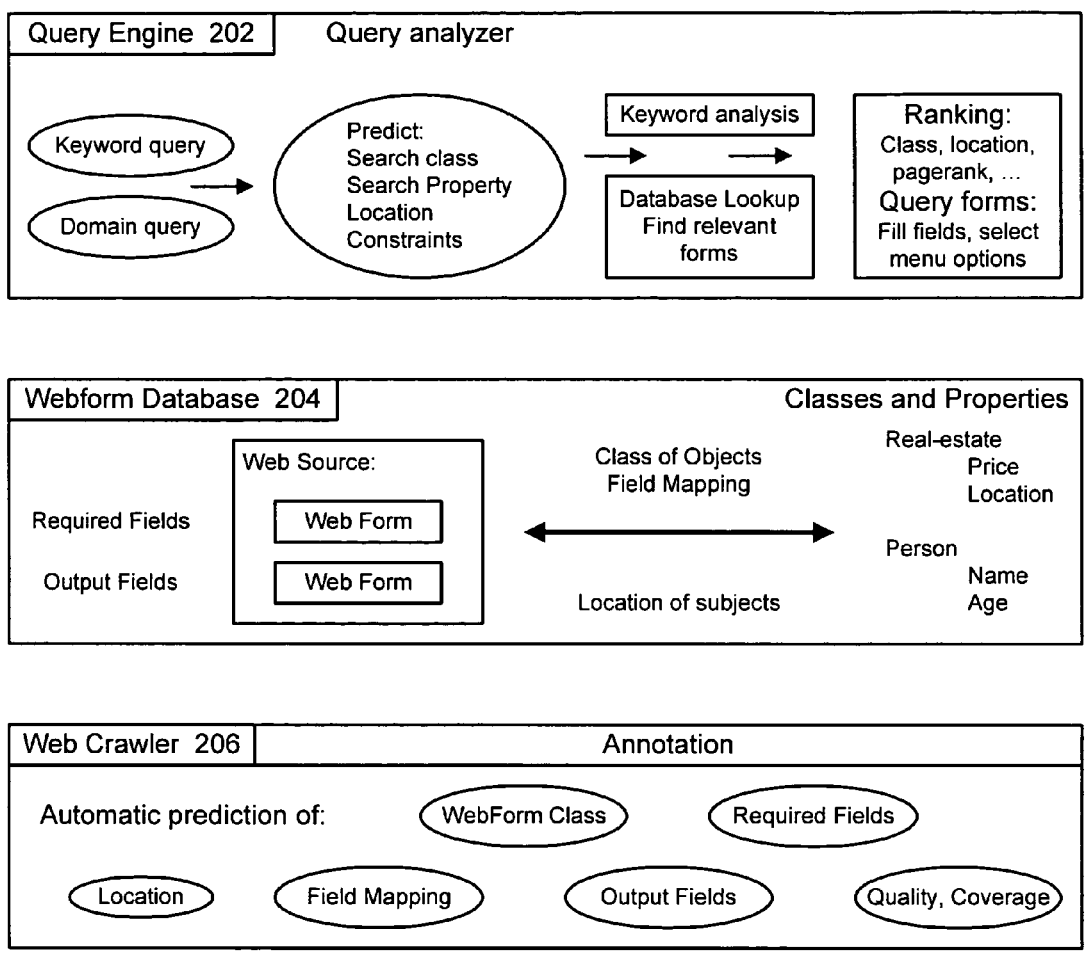
FIG. 2 illustrates the structure of a form engine in accordance with an embodiment of the present invention.

FIG. 2 presents an overview of form engine 106 (which is also referred to as a "deep-web search query engine") in accordance with an embodiment of the present invention. As illustrated in FIG. 2, form engine 106 includes a set of tools that facilitate constructing a search engine for the "deep web." The deep web refers to the part of the web that hides behind forms and is therefore not accessible to traditional search engines. With these tools, both a general-purpose search engine, and domain-specific engines that focus on certain topics, may be constructed. As illustrated in FIG. 2, the tools include: a query engine 202; a web-form database 204; and a web crawler 206 (which includes form analyzer). During system operation, web crawler 206 first obtains web-based forms of interest, and stores corresponding form-related information for the web-based forms of interest in web-form database 204. Next, query engine 202 accesses this form-related information from web-form database 204 to facilitate subsequent searching operations through content which is accessible through the web-based forms. These and other aspects of the present invention are described in more detail below.

The Database Schema

In one embodiment of the present invention, the database describes web sources in terms of an ontology of classes and properties, which is referred to as the "search ontology" (SO). The classes and properties are referred to as "SO-classes" and "SO-properties," respectively. In various embodiments, the SO-classes form a hierarchy (not necessarily a tree, but a directed acyclic graph). Moreover, the SO-properties have domains (the classes in the ontology they refer to), and ranges (either data types or other classes in the ontology). In various embodiments, any knowledge-base editing tool can be used to create the ontology. In various embodiments, the SO is exported into a Web Ontology Language (OWL) file.

In various embodiments, the database has a distinct data "source" or each web page (identified by its URL) is a data source. (Note that the terms "web page," "data source" and "web source" are used interchangeably in this document.) The database captures at least some of the following aspects of each source:

1. the class of the source (e.g., a portal, university, newspaper);
2. the geographic location most relevant to the source (when applicable), e.g. the city of Seattle in Washington state for the Seattle Times; and
3. the page rank of the source.

For each form in the source the following information can be captured.

1. Fields in the form—For each field the information recorded can include its parameter name (used to invoke some server-side script), the human-readable or visible text for that field, field types (text, select box, radio button, or checkbox), and exemplary values for the field (e.g., the options in a select box).
2. The class of the form—This information specifies the types of objects that can be obtained by querying the form. For example, books, hotels, restaurants. Note that a source can have several forms on it, and they can relate to different classes of objects (e.g., newspapers often have forms for looking for houses, jobs and cars for sale).
3. Geographic location—This information specifies a geographic location which is specific to the objects retrieved using the form.
4. Required fields—These are field which are required to submit the form. In some cases, there are multiple combinations of fields that can satisfy the requirements.
5. Output properties—This specifies the type of information we will obtain from answers to a successful form submission. These are described as the SO-properties we are likely to find in the answers.
6. Schema mapping—This is the mapping between the fields in the form and the SO-properties. Note that in some cases, these mappings may be complex. For example, it is common for a field to ask for either the ZIP code or the city and state. This mapping can involve multiple SO-properties, but our database records the exact combinations of SO-properties that can be filled in the field.
7. Additional keywords—These are additional keywords that describe the web form.

Creating Content for Source Database

In one embodiment of the present invention, a set of candidate web sources is collected and processed as described below to predict the database attributes associated with each source. The result of this processing can be shown to a human annotator who can certify the database contents and can change them if necessary. Note that it does not matter where the candidate sources are obtained from. A special set of crawlers that discover content which is especially appropriate for the engine is described below.

Web Source Preparation

In one embodiment of the present invention, the first step in processing a web source is to locate the forms in the source and to extract the text corresponding to the fields in the form.

Web Page Classification

In one embodiment of the present invention, the web source is subsequently classified into the ontology classes. Note that the class of the source is being classified, not the objects found in a form in the source. In various embodiments, a TF/IDF text classifier is employed. In various embodiments, each web page is represented as a word vector with each word having its weight set as the product of term frequency (number of occurrence on the page) and its inverse document frequency (1/log(1+number of pages with the word)). The weights are all normalized such that the word vector is of unit length. As training data, web pages that have already been labeled with SO-classes are used. In the training phase, given these labeled web pages, the mean word vector $mv(c_i)$ is computed for each search class $c_i$. To predict the SO-class for any new web page, the cosine measure between its word vector and the mean vector for each of the search classes can be computed. In various embodiments, the search classes with the three highest values for the cosine measure are chosen as candidate search class matches. Note that the contents of a web page can first be pre-processed to remove any stop words and to stem all possible words.

Web Form Classification

Next, in various embodiments the forms on the page are classified into the classes in the ontology. This classification attempts to predict which kinds of objects would be found in the database queried by the form. Note that this is quite different than classifying the form itself, and that the context of the page may or may not provide good predictive power about the classification. For example, on a recipe site, the words on the site are typically very indicative of the content of the database. However, on a newspaper site, we may see several forms (for real-estate, used cars, job ads) and the words on the page may provide no clue as to the content of the corresponding databases.

In various embodiments, the same idea of a TF/IDF classifier is employed. Two word vectors are computed for each web form: a word vector for the entire web page (same as for the web page classifier), and a word vector for the form that includes just the words that appear in the form and just before and after the form. Furthermore, two separate classifiers are trained using the labeled training data. Note that this training in done for both the classifiers on the labels of the form, and not the page. Moreover, note that these labels are different from those used by the web page classifier. When classifying new forms, both trained classifiers are applied on the form contents. Their results are combined based on the number of forms on the same web page. If there are a number of forms on the page, then the prediction made by the page text classifier is given a lower weight:

$$sim(f,c_i)=pf \times sim_{page}(f,c_i)+(1-pf) \times sim_{form}(f,c_i),$$

where $sim(f,c_i)$ is the predicted similarity of the form f and the SO-class $c_i$, and where the page factor pf=0.3+0.61(num forms on page).

Predicting Required Fields and Output Fields

In various embodiments, required input fields and output fields are predicted based on past experience. For each class in the ontology, we look at previously annotated sites and find which fields have been marked as required or output. In various embodiments, there may be several clusters of possible output fields, and these clusters may be mined, and displayed to the user so that the user may make a selection.

Schema Matching

Next, in various embodiments, a mapping between the fields in the form and the SO-properties of the SO-classes that the form had been mapped to is predicted. This can involve employing an LSD-like multi-strategy approach for predicting field to property mappings. (For more information on LSD, see A. Doan, P. Domingos, and A. Levy, "Reconciling Schemas of Disparate Data Sources: A Machine-Learning Approach," *SIGMOD* 2001, pp. 509-520.) In doing so, each SO-class can be treated as a separate field-matching problem: the mediated schema has the SO-properties of that class. Moreover, each web form is a source schema, and example mappings are provided where the fields of the web form are matched to properties of the search class. This labeled training data is used to train a variety of base classifiers and also a meta-classifier that combines the predictions of the different base classifiers.

The different base classifiers we can use include: (a) an internal name matcher that uses edit distance to compare parameter names of the fields, (b) a visible text matcher that uses TFIDF to compare the text that can be easily associated with each visible field, (c) an instance matcher that uses TFIDF to compare the text in the different options for a field value, e.g. for a select box or radio button.

In various embodiments, to implement the meta-classifier, the meta-classifier library in the Weka™ toolkit, which is similar to the technique used in LSD, can be used to learn a separate combination hypothesis for each field. Moreover, the trained base and meta-classifiers can be used to compute similarities between each web form fields and search class properties.

In various embodiments, a constraint-solving mechanism is used to output the specific matches. The match selection can be modeled as a cost minimization process, wherein the cost of selecting a particular set of matches is dependent on the similarities estimated between the elements in the chosen matches. In addition, desirable properties of the mappings can be encoded as costs and included as part of the minimization process, e.g. a penalty cost of mapping more than one field to the same SO-property.

This cost minimization may be performed using a randomized technique. For example, the process can start with a random assignment. Then, one element (web form field or SO-property) can be considered at a time and the system can try to match it with the best possible candidate element in the other schema (given the mappings for the rest of the elements in web form and SO-class) so as to minimize/reduce the cost of the mapping. Note that the definition of "best possible candidate" may be implementation dependent. This process continues until the mapping converges or until a fixed number of iterations occur.

In summary, given a new web page, a web-page classifier can used to predict the SO-class for the source. Next, a web-form classifier can be used to identify the top candidate SO-classes for each web form on the web page. Then, for each web form and given candidate SO-class, the form-field-to-SO-property matcher can be invoked to compute similarities between the fields on the web form and the properties of the search class. A constraint satisfaction module can then be invoked to pick the particular field-to-SO-property matches.

Location Prediction

In various embodiments of the present invention, for each web page, the most likely country or state, and within it the most likely city, are also predicted. In various embodiments, during the location analysis, a two-level hierarchy of locations is considered: the first level includes all the countries of the world (except the U.S.) and the states in the U.S., and the second level includes cities. In various embodiments, it is assumed that city names are unique within each country or U.S. state. For ease of understanding, in the discussion below, sometimes only states are referred to, but the same holds true for countries as well, unless otherwise mentioned.

In various embodiments, the location prediction may be done as follows. First, for each country or U.S. state, its location score is computed:

$$L(s_i) = \sum_{w_j} L_s(w_j, s_i).$$

wherein each word $w_j$ in the web page text contributes $L_s(w_j, s_i)$, a measure of the likelihood that it represents a location in the country or state $s_i$. The most likely state is the one with the highest location score, provided the score is greater than a threshold $t_L$. No state is predicted if none of the scores are greater than $t_L$.

Each score $L_s(w_j,s_i)$ contributed by each word is computed as one of the following:

(a) $C_{state} \times idf(w_j)$ if $w_j$ is the name of the state (or its abbreviation), wherein idf(w) is the inverse document frequency of the word w (defined below);

(b) $C_{city} \times idf(w_i) \times popl(w_j, s_i)$ if $w_j$ is the name of a city within the state, wherein $popl(w_j, s_i)$ depends on the population of the city named $w_j$ in the state $s_i$; and (b) $C_{zip} \times idf(w_j) \times popl(w_j, s_i)$ if $w_j$ is the zip of a city within the state, wherein the population score is that of the corresponding city.

In the above, the population score popl(w, s) can be defined as follows:

$$popl(w_j, s_i) = \begin{cases} 1 + \log\left(\dfrac{\max(\text{population}(w_j, s_i), 10000)}{10000}\right) & \text{if } w_j \text{ is a city,} \\ 2 & \text{otherwise} \end{cases}$$

Moreover, the inverse document frequency (IDF) of a word can be defined as follows:

$$idf(w) = 1.5 \times \frac{\log 5}{\log(5 + \text{count}(w))},$$

where count(w) is the number of web pages in our collection that contain the word w. Thus, the IDF score can vary from 1.5 to 0 depending on the frequency of the word.

Note that each word can correspond to multiple locations, e.g., cities in different states and countries. In this case, such a word contributes to the location score of each of the states or countries.

In various embodiments, the case of state and city names consisting of multiple words is also handled. In doing so, the web page text is first pre-processed to identify all such multi-word location names which are then treated as single words.

In alternate embodiments, lexical or grammatical analysis of the text on the web page may also be performed.

In various embodiments, once the most likely U.S. state or country has been recognized, the location scores for each city within it is computed by using the criteria (b) and (c) in the above list. In various embodiments, a city is predicted if its score is more than 0.3 of the state/country location score.

For example, for the University of Washington Computer Science & Engineering homepage, the predicted locations are WASHINGTON State and SEATTLE, while for the Yahoo main page no locations are predicted.

Site Crawler

Web sites typically support query interfaces on multiple web pages which enable access to data in different sources. For example, the New York Times has web forms for the weather and classifieds in the New York region, stock tickers for the different stock exchanges, etc. The site crawler explores such a web site (a domain like nytimes.com for the New York Times) to discover all such available web forms.

Like a typical crawler, the site crawler pursues hyperlinks recursively starting from a seed page (e.g., the main page of the web site). In addition, it can perform two operations for discovering web forms.

1. It filters web forms. More specifically, for each new web page discovered by the crawler, it determines whether the web forms on the page, if any, are interesting and worth recording (e.g., email subscription forms are not very interesting and may be ignored).
2. It reconciles duplicate web forms. Very often the same web form appears on different web pages in the same web site, and the duplicate web forms are detected to prevent multiple recordings of the same source.

In various embodiments, the filtering of web forms may be done in a semi-automatic fashion. Classifiers are employed to predict the utility of each form (i.e., should the form be considered or ignored). These classifiers are trained from manually-supplied training data. Each web form has a utility score that is the score reported by the classifier. The web pages on each web site can be ranked in decreasing order of the scores of their forms. A user may be requested to scan this list to identify the most useful ones while the rest are ignored.

Two web forms are considered to be identical if they invoke the same method and use exactly the same parameter values. During the reconciliation process, the forms on each page are compared against already extracted forms and are eliminated if an identical form already exists. As part of the reconciliation process, the crawler also determines which of the multiple occurrences of a web form have to be retained as the principal instance. For example, weather reports are available both from the "cnn.com" and "money.cnn.com sites," but "money.cnn.com" might be the more suitable one. In various embodiments, simple heuristics are used to make this selection: (a) larger domain names (with the same suffix, e.g., money.cnn.com as opposed to cnn.com) typically refer to more-specific web sites and hence are preferred, while (b) smaller path names refer to more authoritative pages and are hence preferred.

Web forms on a web page can often refer to methods in different domains (e.g., the auto sales form on New York Times is redirected to a method on cars.com). These references indicate the importance of the referenced source and are recorded separately for the ranking process. In various embodiments, they are not reconciled since they typically have different parameter values (with information specific to the referring web site).

Querying and Ranking

Query Analyzer

The query analyzer can be adapted to consider keyword queries from a user and to predict the SO-class in the ontology that is most relevant to the query. During this process, a structured query is also constructed from the user query.

In various embodiments, three types of prediction can be used to predict the most likely search class for each query: (1) word-based prediction; (2) property-based prediction; and (3) feedback-based prediction. These types of prediction are described in more detail below.

Word-Based Prediction

Words are often strongly correlated with specific SO-classes and this correlation can be used a basis for class prediction. In various embodiments, a naïve-Bayes-like scheme, augmented with feature selection, can be employed. The predicted class is the one that is most likely to generate the words in the search query. For example, if the user query is $w_1 w_2 \ldots w_n$, then $$C = \text{argmax}_{C_i} P\left(w_1 \ldots w_n | C_i\right) = \text{argmax}_{C_i} \prod_{w_j} P(w_j | C_i).$$

The probability of each class, i.e. $P(w_1 w_2 \ldots w_n | C_i)$, is obtained by normalizing the scores computed in the above expression such that they sum to 1. Described below is how the marginal probability can be estimated for each word and feature selection in accordance with an embodiment of the present invention.

Marginal Probability Estimation—In various embodiments, the marginal probability of each word is given by the expression:

$$P(w_j | C_i) = \frac{K \frac{1}{|W|} + \sum_{d_k \in D_i} D(w_j, d_k)}{K + |D_i|}$$

where $D(w_j, d_k)$ is the weight of word $w_j$ in the document $d_k$ (each document has a total weight of 1, and the weight of each word is proportional to the number of occurrences of this word in the document). Moreover, $D_i$ is the set of documents that have been labeled with class Ci, and K is the smoothing constant which is greater than 0. The smoothing ensures that in the absence of any training data the marginal probability distribution is uniform (1/|W|).

Feature Selection—Since a small amount of training data is employed, in order to avoid over-fitting, in various embodiments, only those words that are discriminative enough are used. In various embodiments, the ability of a word to discriminate between SO-classes can be measured by its entropy:

$$H(w_j) = -\sum_{C_i} P(w_j|C_i) \log P(w_j|C_i)$$

The marginal probabilities $P(w_j|C_i)$ are normalized so that they sum to 1. All the words are sorted by their entropies and only the ones that are greater than a particular threshold are included. Furthermore, in various embodiments, (a) only words that have appeared in at least N different pages in total (typically 10-15), are considered, (b) only the top 10 classes for each word while computing the entropy are considered, and (c) probabilities for the non-top 10 classes are set to be equal to that of the 10th search class. Note that the above definition is not exactly the technical definition of entropy since entropy is better defined when computed on $P(C_i|w_j)$. In various embodiments, feature selection may be performed via Mutual Information and the Fisher Discriminant.

Property-Based Prediction

In various embodiments, property recognizers are employed to identify interesting constants in user queries. SO-classes can be predicted based on the properties recognized. For example, the most likely class may be the one that is most likely to generate the recognized property values in the user query (e.g., Acura is the name of a car make and Integra is the name of a car model, and hence the query "used Acura Integra" is most likely referring to Cars). The following expression is used to determine the most likely class:

$$C = \underset{C_i}{\mathrm{argmax}}\, sigmoid\left(\sum_{V_k \in PS} \alpha_k \times \beta(V_k, C_i) \times \gamma(w_j \in V_k)\right)$$

where PS is the set of all property recognizers, $V_k$ is the k-th recognizer, $\beta$ is a indicator function that is equal to 1 if the recognizer $V_k$ recognizes a property of the class $C_i$ (and 0 otherwise), and $\alpha_k$ is the weight or relevance of $V_k$. In various embodiments, each recognizer is trained to recognize examples of a particular set of search class properties and estimates a confidence score $\gamma$ that a word (or sequence of words) is an instance of the trained property. The score for each class is obtained by normalizing the probabilities for the various search classes to sum to one.

In various embodiments, one or more of the following recognizers can be employed:

1. a search-class recognizer which recognizes a word or a sequence of words representing the name of a class, a part of the name of the class or a synonym (synonyms are looked up from a pre-defined list of words associated with each class);
2. a property-name recognizer which recognizes a word representing the name of some property in the ontology;
3. a first-and-last-name recognizer which recognizes a common last name or first name (the score in this case is a measure of the frequency of the name as per the U.S. Census);
4. a location recognizer which recognizes the word or sequence of words representing a location name, i.e., city, state, or country name, or a valid U.S. ZIP code.
5. a generic-property recognizer which recognizes is the word representing a known example of a property, i.e., is there a known mapping from some web form field to the property by which it can be reasoned that the word is an example of the property (For example, "Acura" is a car make, since it appears as one of the options in a select box for car makes in a used car search web form. This recognizer can reuse the property mappings predicted by the schema matcher); or
6. a year recognizer which recognizes a year between 1900 and 2010.

The recognizer weights are set such that multiple properties may be recognized for a search class to be successfully detected. Many of the recognizers return confidence scores ($\gamma$) that are proportional to the IDF score (defined earlier). This enables words that occur rarely to be a unique representation of one class as opposed to others that occur frequently.

Feedback-Based Prediction

In various embodiments, the first 20 hits from just a keyword query are considered. From this, the number of web forms that have been labeled (either manually or automatically) to each SO-class is estimated. If one particular class dominates, then that is likely the class most relevant to the user's query. In various embodiments, a SO-class is considered to dominate if it is the class with the most number of forms and these forms account for more than 40% of the top 20 hits. The score for the class is ½ that of the fraction of the number of hits in the top 20. In various embodiments, the probability computed using each of the above criteria is combined using the logical-OR operation to determine the final search class probability, i.e. $p=1-(1-p_1)(1-p_2)(1-p_3)$.

Location Detection

Given a sentence or a phrase, each word in it can potentially be the name of a location. There can also be multiple locations that have the same name, e.g. Washington. Accordingly, this module is adapted to identify the words in a phrase that most likely are the name of some location and the most likely single location referred to by that name. In various embodiments, a probabilistic labeling scheme is employed.

Suppose the word w is the name of some location (city, state, or country). In general, there can be more than one geographic location with that name (e.g., there are many cities in the U.S. with the name Paris, though the most famous one is the one in France). The situation is formulated with letting $L_w$ be the candidate locations for a word w. $L_w$ includes the null location to indicate that w while being the name of a location does not refer to any real location (e.g., the words home and page in the phrase "home page" do not refer to any location though there do exist towns in the U.S. named home and page). The probability $P(w, l_i)$ that the word w refers to the candidate location $l_i$ in $L_w$ is estimated. The probabilities are initialized to be all equal to $1/L_w$. In various embodiments, the probabilities are iteratively re-estimated as below:

$$P(l(w) = l_i) = \frac{1}{z} e^{\sum_{F_j \in \Gamma} k_j(F_j(l_i) - a_j)}$$

where $\Gamma$ is a set of features, $F_j(l_i)$ is the value of the j-th feature when w refers to the location $l_i$, $k_j$ is the weight of the feature, $a_i$ is a base offset of the feature, and Z is a normalization constant such that $$\left[\sum_i P(l(w) = l_i)\right] = 1.$$

The features used are similar to those used for the location prediction.
1. Population of the location:

popl($l_i$)=1+log(max(population($l_i$),10000)/10000) if $l_i$ is a city; and popl($l_i$)=2 otherwise.

2. Inverse document frequency of the word:

idf(w)=1.5×log(5)/(log(5+count(w))).

3. Co-located candidate locations: If $l_i$, one of the candidate locations for the word w, is a city or state in the U.S., then $$statescore(l_i) = \sum_{w_j \neq w} \left[\sum_{l_j \in L(w_j)} P(l(w_j) = l_i) \times (state(l_j) = state(l_i))\right], \text{ else}$$

$$statescore(l_i) = \sum_{w_j \neq w} \left[\sum_{l_j \in L(w_j)} P(l(w_j) = l_i) \times (country(l_j) = country(l_i))\right].$$

In various embodiments, the probabilities of all words with candidate locations is iteratively re-estimated until either there is convergence (all words have a candidate location with probability more than 0.5), or a maximum number of iterations are performed. For each word the acceptable candidate locations are ones that have a higher probability than the null location. If the null location has the highest probability then no locations are detected for that word. This labeling process is able to effectively remove locations that have common place names (e.g., Home Page) and can easily disambiguate locations in the presence of additional information (e.g., 98105 Redmond is identified as Seattle, Wash. and Redmond, Wash.). As with the location prediction, there can be a pre-processing step where potential multi-word locations are identified and then treated as single words for the rest of the analysis.

Query Description Construction

In various embodiments, once an SO-class has been predicted for a user query, a structured query is constructed by mapping the individual words in the query to properties of the chosen search class. As part of the property-based class prediction described earlier, each Recognizer creates a RecognizerResult object. This object contains a number of Recognizerinfo objects. Each Recognizerinfo object records that the recognizer has identified a particular word (or a sequence of words) in the query with some confidence to be an example value of a particular SO-property (or a set of properties). Using this information, the query description module tries to match each word in the user query to the most likely search class property. In various embodiments, this can be done using a greedy algorithm. If the name of a search class property occurs in the query, it is identified as a requested output property, i.e. the property must be part of the result of a form submission. The other words in the user query can be mapped to the SO-property with the highest confidence score. If a word is not recognized in any Recognizerinfo object, then it can be left as-is and not forced to any property. A QueryDescription object is then constructed for each search class such that its QueriedProperties identify the required output properties and ConstrainedProperties identify properties of the search class that have some words in the user query mapped to them. For example, "Telephone David Ko 98102" results in the structured query Person{Telephone=?, FirstName=David, LastName=Ko, ZipCode=98102}.

Ranking

Ranking Criteria

In various embodiments, the search results in response to any search query are ranked based on one or more of the following criteria:

An approximate page rank score which captures the importance of a particular page. This can be estimated as the logarithm of the number of incoming links to that page.

Keyword scores which capture the IR-like score that computes the relevance of the text on web page to the user's query. There are three components to this: the page-text-score determined from the text on the web page; the anchor-score determined from text around the top 10 incoming links; and the title-score determined from title of the web pages. These scores can be reported directly from the values computed by a library that is used to index the web pages.

Ontology scores capture the relevance of the SO-classes predicted for the user queried to those of the web pages returned. Given a particular SO-class selected from a user's query, the ontology score has two components: (1) the query-match-score is the probability with which the particular class was selected (this is not dependent on the content of the returned web pages and is the result of the class prediction described earlier); and the ontology-match-score is the highest probability with which a form on a particular page is classified to that search class.

A form score captures the ability of a form to answer a user's query. The query-analysis module determines for each user query the properties that can be input to any form for a particular SO-class and also the properties that are expected as output. With this information, a form score can be computed for each web page, which measures the best compatibility of forms of a page to the user query. The form score compares this description of the query with the descriptions of the various forms, and is computed for each page using the formula $$FS(p) = \max_{f \in p} FS(f),$$

where f is a form that is on page p and $$FS(f) = \frac{|I_f \cap Q_I|}{|I_f \cup Q_I|} \cdot \frac{|O_f|}{|Q_O|}$$

where $I_f$ and $O_f$ are the input and output properties (i.e., fields and results) of a form f, and $Q_I$ and $Q_O$ are the input and output properties extracted from the user query. The first term is the Jaccard Coefficient and measures if the values in the user query are sufficient for invoking a particular form. The second term measures the ability of a form to produce the outputs required by the user.

A location score captures the distance of the most-relevant location for a web page from locations detected in the user query. The locations for a page can be either manually tagged or the result of automatic prediction. The locations for a query are the automatically detected ones. If both are cities, the location score of a page p within 50 miles of the query location can be given by 1 distance/50. If one of them is a city and the other a state, then a score of 0.5 is assigned if the city lies within the state. In all other cases, a score of 0 is used.

Ranking Combination

In various embodiments, the different score components are combined using a linear combination. The weights used in the combination are dependent in part on the query analysis. They are assigned default values, but (a) when an SO-class is predicted, the weight of the ontology match score is increased, and (b) when a location is detected, the weight of the location score is increased.

Automatic Form Invocation (Query Through)

Before a web form can be invoked on behalf of a user, the words in a user query have to be mapped to the correct fields of the web form. The correct method invocation string has to then be determined before the form is submitted. In various embodiments, this can achieved through two operations: (1) mapping words to field values, and (2) constructing the invocation string. These two operations are described below.

Mapping Words to Field Values

The result of the query analysis is a query description that includes a mapping from the properties of a class to words in the user query. The source description for each web form already includes a mapping from the fields of the web form to the properties of the search class. These two sets of mappings are composed so as to associate words with fields. This generally suffices for text input fields. However, for select boxes, radio buttons, and check boxes, the words for each field have to be then used to pick the correct internal values for the corresponding input. For example, the word "Washington," which is one of the options in the select box might correspond to an internal value 50 (or anything else) that has to be used as the parameter value before invoking the method for the form. The mapping from select box values to internal values can be stored as part of the web form description and can be used to pick the correct internal values for method invocation. However the words in the query might not correspond exactly to an option in the select box. In general, we pick the select box option that is the least edit-distance from the query words. For special data types such as state names, short forms for state names are used to determine the correct internal values.

Constructing the Invocation String

Many web sites often use Javascript to modify the method invocation string before form submission. This is done to prevent each crawling of their web forms. These web forms cannot be automatically invoked easily. In various embodiments, to get around this impediment, a Javascript emulation engine is used. In one implementation, a simple browser client is invoked, which in turn invokes a JavaScript engine. As part of the description of any web form, Javascript fragments on a web page are also recorded. Before invoking a web form, the script on the emulation engine is executed to get the modified invocation string if any. The parameters (and their mapped words or internal values) are then concatenated to the invocation string along with the values for any hidden inputs.

Once the invocation string is completely constructed, it can be used to submit the form automatically on behalf of the user. In various embodiments, the mapping for fields to words and internal values is done as part of the query processing and result ranking, but the Javascript emulation is done on the web server on when the user clicks on a particular result hyperlink. Hence, clicks from the search results page are directed to the web server, which then redirects it with the completed invocation string to the correct target web site. In various embodiments, this can also be done on the client side.

Process Summaries

Crawling Process

FIG. 4 presents a flow chart illustrating the process of crawling through web pages to gather information related to web-based forms in accordance with an embodiment of the present invention. The system starts by obtaining web-based forms to be searched (step 402). As mentioned above, the system can obtain these web-based forms from a number of sources. For example, the system can crawl through web sites to identify web-based forms, the system can receive manually provided web-based forms, or the system can find web-based forms through methods other than crawling. During this form-obtaining process, the system can facilitate a filtering operation to manually or automatically filter out forms that are not to be searched. This filtering process can be based on some type of pre-specified criteria.

Next, the system creates database entries for the identified forms (step 404). The system then stores the database entries in a form database to facilitate subsequent searching operations (step 406). Note that this form database can include a web index and associated documents, which can be used to facilitate web search queries that return both ordinary documents and documents that result from form queries.

In some cases, the system can also retrieve pages from a given form by submitting queries to it (step 408). (This process is described in more detail below with reference to FIG. 5.) Next, the system stores the retrieved pages into a web index (or into some other type of database) along with other web pages to facilitate searches through the retrieved pages (step 410).

Retrieving Pages From a Form

FIG. 5 presents a flow chart illustrating the process of retrieving pages from a given form in accordance with an embodiment of the present invention. During this process, the system uses information stored for the given form in the form database to generate constants to be inputted into specific input fields in the given form (step 502). Next, the system uses the constants to fill input fields in the given form (step 504). This causes the form to produce corresponding outputs which the system stores in a web index (step 506).

Note that extracting the content from the form can involve accessing the given form through a Uniform Resource Locator (URL) which contains a GET-string that extracts the content from the given form.

Also note that the process of generating constants for a given field in a given form can involve obtaining constants from a drop-down menu associated with the given field, and then storing the constants. This allows the constants to be subsequently used as inputs to the given field or as inputs to similar fields in other forms during subsequent query operations.

Searching Process

Figure 6:
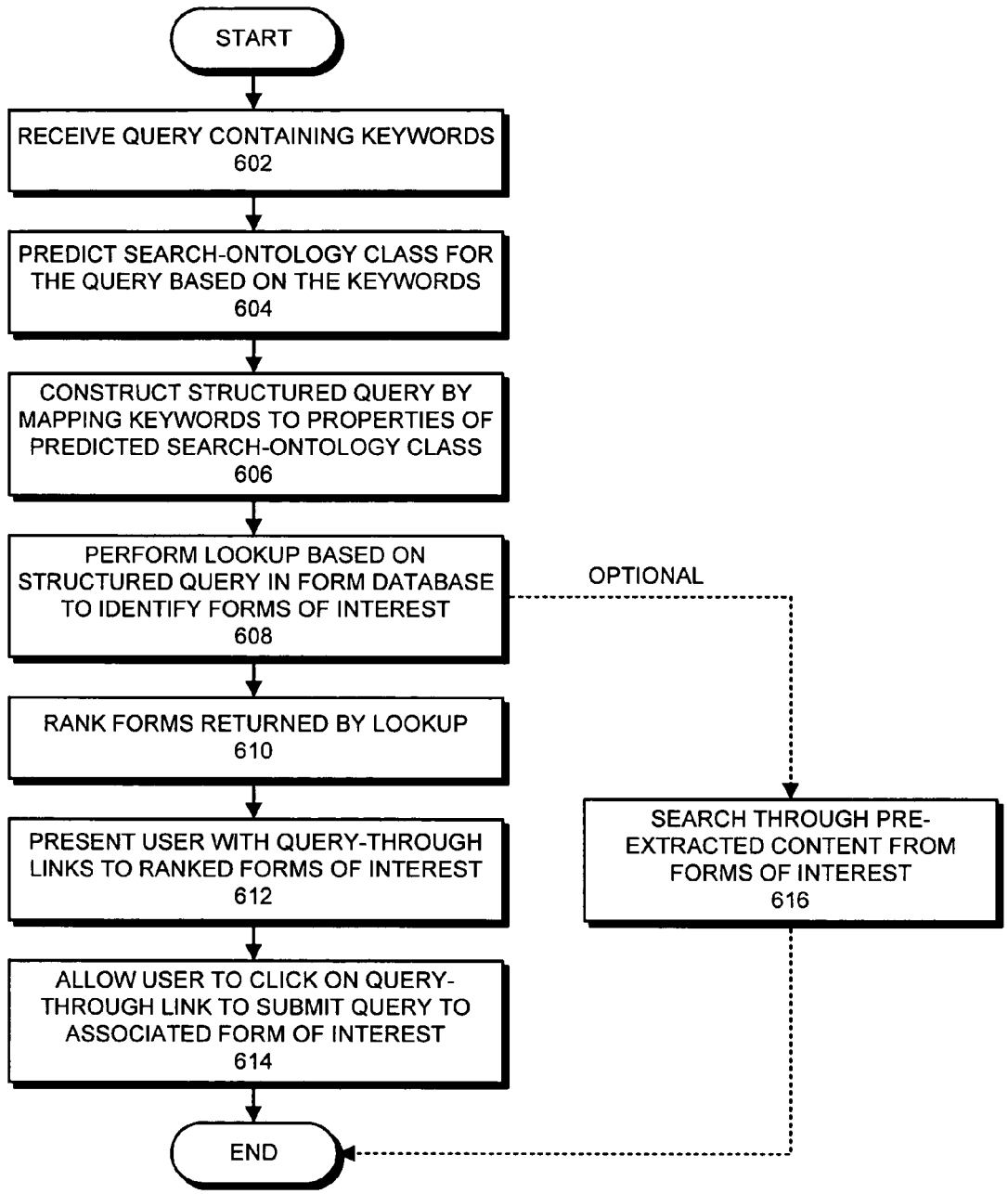
FIG. 6 presents a flow chart illustrating the process of searching through content which is accessible through web-based forms in accordance with an embodiment of the present invention.

FIG. 6 presents a flow chart illustrating the process of searching through web-based forms in accordance with an embodiment of the present invention. The process starts when the system receives a query containing keywords (step 602). Next, the system predicts a search-ontology class for the query based on the keywords (step 604). The system then constructs a structured query from the keywords by mapping keywords to properties of the predicted search-ontology class (step 606).

Next, the system performs a lookup based on the structured query in the form database to identify forms of interest (step 608) and ranks these forms (step 610).

The system then presents the user with query-through links to the ranked forms of interest (step 612), and allows the user to click on a specific query-through link to submit a query to the associated form of interest (step 614). This query will hopefully return the content of interest.

If the lookup in the database in step 608 returns a form containing content that has been pre-extracted during the crawling process, the system can optionally search through the pre-extracted content instead of having to query the form to obtain the content (step 616). Note that this pre-extracted content can be stored in indexed form, like a normal web page, to facilitate this type of searching operation.

Conclusion

The above described engine and tools provide, but are not limited to, the following innovations.

Database of source descriptions—A database that describes the various aspects of the data sources is provided to facilitate a deep-web search.

This database describes the objects accessed by the form on the web source. The database also identifies classes of objects in the domain. These classes belong to a so called Search Ontology that is used to organize the classes into an inheritance hierarchy. The database also identifies the geographic location of the listings and the web source whenever applicable. In addition, the database identifies various aspects of the form that are needed for automatic querying, including: which fields in the form are required in order to query through it; which properties of the objects are provided by the answers to the queries; and how the fields in the form map to fields of the database.

Content creation—various embodiments of the present invention automatically find sources for the search engine and automatically guess how to place them in the database. For each web form, a number of items are predicted, including: the most likely classes of the objects obtained by the form; the nature of the source; the location of the contents; and the mappings of the fields of the web form to properties of the objects. This enables a human annotator to later review the guesses made and correct them if necessary. In various embodiments, the tool includes one or more of the modules: (a) a module for locating forms in an HTML page, (b) a module for extracting the names of the fields in the form from the HTML, (c) a module for predicting the class of a web source, (d) a module for predicting the class of web forms within a web source, (e) a module for predicting the location associated with a web source and form, (f) a module for predicting the mapping of the web-form fields, (g) a module for predicting the output properties of a web form, and (h) a module for predicting the required fields of a form.

Querying and ranking—Given an input keyword query, the above-described engine generally finds the web pages with the most relevant web forms and ranks them appropriately. In some cases, an answer to a query is a ranked set of forms, each of which can be consulted further to obtain relevant data. In other cases, the engine fills out the form and displays the answers obtained from filling the form. In various embodiments, a user may see a partially filled form and therefore expedite the query answering process (or correct the inputs to the form, if necessary). In various embodiments of the present invention, the query-answering process may involve two components: (1) a query analyzer; and (2) a ranking module.

The query analyzer analyzes the query to map it to the terms of the ontology. The following predictions may be made by the query analyzer: a class (or set of classes) in the ontology that the query is most likely concerned with, the set of properties of that class that are mentioned in the query, constraints in the query (e.g., a person's name, car model), and a location that the query may be referring to.

The ranking module orders web pages in the database by the relevance of their web forms to the user query. In doing so, the ranking module considers one or more the following factors: (a) the class in the ontology that the query and the web forms map to, (b) the properties mentioned in the query, (c) proximity to the location mentioned in the query and associated with the web source, (d) importance (page rank) of the web source, (e) keyword relevance between the web source and the query, (f) related classes in the ontology, and (g) classes that can be inferred from the keywords in the results to the query.

Querying through forms—The above-described engine lets user query through web forms by deriving from the user's query the input values for fields in the forms. To do so, the engine considers: the set of required fields in the form, the mapping between the form fields and the ontology properties, and set of other items. These other items can include: (a) a mapping from values in the query string to specific instance values of ontology properties, (b) a mapping from values in the query string to values mentioned in selection menus in the form, (c) translations of formats from the query into those in the form, and/or (d) a choice of radio buttons or checkboxes in the form to pose a precise query to the form's server.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for crawling through web-based forms, the method comprising:

identifying, by a computer system, web-based forms to be searched, wherein the identified web-based forms comprise input fields, which are used to generate a corresponding database query to a content database;

creating entries in a local form database for the identified web-based forms, wherein the created entries are used to generate subsequent searches in the content database;

storing metadata about the identified web-based forms in the local form database, wherein the stored metadata are used to predict and map information associated with the identified web-based forms;

receiving a user query, from a user;

predicting a search class based on a probability that the predicted search class generates a structured query which corresponds to the received user query;

selecting, by the computer system, at least one web-based form from the local form database based on the generated structured query, the predicted search class, and the stored metadata;

presenting the user with at least one query-through link to the at least one selected web-base form;

selecting a query-through link from the at least one presented query-through link;

automatically submitting, by the computer system, a corresponding query to the content database through the selected web-based form corresponding to the selected query-through link.

2. The method of claim 1, wherein identifying the web-based forms to be searched involves manually or automatically filtering out other web-based forms, which are not to be searched.

3. The method of claim 1, wherein the method further comprises:
   extracting content from a given form; and
   storing the extracted content to facilitate subsequent searches through the content from the given form.

4. The method of claim 3, wherein extracting the content from the given form involves accessing the given form through a Uniform Resource Locator (URL) which contains a GET-string that extracts the content from the given form.

5. The method of claim 3, wherein extracting the content from the given form involves:
   generating constants to be inputted into the given form;
   using the constants to fill input fields of the given form;
   extracting the content from associated output fields of the given form; and
   storing the content in the local form database to facilitate subsequent queries involving the content.

6. The method of claim 3, wherein extracting and storing the content from the given form involves:
   obtaining constants associated with a given field of the given form from a drop-down menu associated with the given field; and
   storing the constants, whereby the constants can be subsequently used as inputs to the given field or as inputs to similar fields in other forms during subsequent query operations.

7. The method of claim 1, wherein creating entries in the local form database for the identified web-based forms involves identifying:
   a class of the identified web-based forms;
   a geographic location which is most relevant to objects retrieved from the identified web-based forms;
   fields of the identified web-based forms;
   required input fields or required combinations of input fields for the identified web-based forms; and
   mappings between fields of the identified web-based forms and associated class properties.

8. The method of claim 1, wherein a given form generates values for output fields by:
   forming a database query from constants received through input fields of the given form;
   sending the database query to a database system;
   receiving a response from the database system; and
   outputting data returned in the response through output fields of the given form.

9. The method of claim 1, wherein metadata about an identified form involves obtaining information related to the source of the identified form, which involves identifying:
   a class of the source;
   a geographic location most relevant to the source; and
   a page-rank of the source.

10. A computer-readable storage medium storing instructions that when executed by a computer cause the computer to perform a method for crawling through web-based forms, the method comprising:
    identifying web-based forms to be searched, wherein the identified web-based forms comprise input fields, which are used to generate a corresponding database query to a content database;
    creating entries in a local form database for the identified web-based forms, wherein the created entries are used to generate subsequent searches in the content database;
    obtaining metadata about the identified web-based forms, wherein the obtained metadata are used to predict and map information associated with the identified web-based forms;
    storing the obtained metadata about the identified web-based forms in the local form database;
    receiving a user query, from a user;
    predicting a search class based on a probability that the predicted search class generates a structured query which corresponds to the received user query;
    selecting a web-based form from the local form database based on the generated structured query, the predicted search class, and the stored metadata;
    presenting the user with at least one query-through link to the at least one selected web-base form;
    selecting a query-through link from the at least one presented query-through link;
    automatically submitting a corresponding query to the content database through the selected web-based form corresponding to the selected query-through link.

11. The computer-readable storage medium of claim 10, wherein identifying the web-based forms to be searched involves manually or automatically filtering out other web-based forms, which are not to be searched.

12. The computer-readable storage medium of claim 10, wherein the method further comprises:
    extracting content from a given form; and
    storing the extracted content to facilitate subsequent searches through the content from the given form.

13. The computer-readable storage medium of claim 12, wherein extracting the content from the given form involves accessing the given form through a Uniform Resource Locator (URL) which contains a GET-string that extracts the content from the given form.

14. The computer-readable storage medium of claim 12, wherein extracting the content from the given form involves:
    generating constants to be inputted into the given form;
    using the constants to fill input fields of the given form;
    extracting the content from associated output fields of the given form; and
    storing the content in the local form database to facilitate subsequent queries involving the content.

15. The computer-readable storage medium of claim 12, wherein extracting and storing the content from the given form involves:
    obtaining constants associated with a given field of the given form from a drop-down menu associated with the given field; and
    storing the constants, whereby the constants can be subsequently used as inputs to the given field or as inputs to similar fields in other forms during subsequent query operations.

16. The computer-readable storage medium of claim 10, wherein creating entries in the local form database for the identified web-based forms involves identifying:
    a class of the identified web-based forms;
    a geographic location which is most relevant to objects retrieved from the identified web-based forms;
    fields of the identified web-based forms;
    required input fields or required combinations of input fields for the identified web-based forms; and
    mappings between fields of the identified web-based forms and associated class properties.

17. The computer-readable storage medium of claim 10, wherein a given form generates values for output fields by:
    forming a database query from constants received through input fields of the given form;
    sending the database query to a database system;
    receiving a response from the database system; and
    outputting data returned in the response through output fields of the given form.

18. The computer-readable storage medium of claim 10, wherein obtaining metadata about an identified form involves obtaining information related to the source of the identified form, which involves
identifying:
 a class of the source;
 a geographic location most relevant to the source; and
 a page-rank of the source.

19. An apparatus that crawls through web-based forms, comprising:
a processor;
a memory; and
a web-crawling mechanism configured to:
identify web-based forms to be searched, wherein the identified web-based forms comprise input fields, which are used to generate a corresponding database query to a content database;
create entries in a local form database for the identified web-based forms, wherein the created entries are used to generate subsequent searches in the content database,
obtain metadata about the identified web-based forms, wherein the obtained metadata are used to predict and map information associated with the identified web-based forms,
store the obtained metadata about the identified web-based forms in the local form database,
receive a user query, from a user;
predict a search class based on a probability that the predicted search class generates a structured query which corresponds to the received user query;
select at least one web-based form from the local form database based on the generated structured query, the predicted search class, and the stored metadata;
present the user with at least one query-through link to the at least one selected web-base form;
select a query-through link from the at least one presented query-through link;
automatically submits a corresponding query to the content database through the selected web-based form corresponding to the selected query-through link.

20. The apparatus of claim 19, wherein the apparatus further comprises a content-extraction mechanism configured to:
extract content from a given form; and to
store the extracted content to facilitate subsequent searches through the content from the given form.

\* \* \* \* \*